(12) United States Patent  
Emberty et al.

(10) Patent No.: US 6,721,086 B2
(45) Date of Patent: Apr. 13, 2004

(54) OPTICAL FIBER EMULATOR

(75) Inventors: Robert George Emberty, Tucson, AZ (US); Craig Anthony Klein, Tucson, AZ (US); Gregory Allen Williams, Grand Rapids, MI (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 09/852,719

(22) Filed: May 10, 2001

(65) Prior Publication Data

US 2002/0167715 A1 Nov. 14, 2002

(51) Int. Cl.[7] .......................... G02F 2/00; H04B 10/08; H04B 10/12
(52) U.S. Cl. .................... 359/325; 398/28; 398/141; 398/161
(58) Field of Search ................. 359/325–332, 359/154, 158, 161; 398/28, 141, 158, 161

(56) References Cited

U.S. PATENT DOCUMENTS

| 4,261,640 | A | 4/1981 | Stankos et al. .......... 350/96.15 |
| 4,486,739 | A | 12/1984 | Franaszek et al. ... 340/347 DD |
| 4,952,057 | A | 8/1990 | Kamikawa et al. ........ 356/73.1 |
| 4,989,938 | A | 2/1991 | Tamulevich ............. 350/96.15 |
| 5,039,218 | A | 8/1991 | Chesler et al. ............. 356/73.1 |
| 5,777,765 | A | 7/1998 | Deloddere et al. .......... 359/158 |
| 5,812,530 | A | * | 9/1998 | Fernandez et al. .......... 370/250 |
| 6,381,385 | B1 | * | 4/2002 | Watley et al. ................. 385/28 |

FOREIGN PATENT DOCUMENTS

| JP | 359055649 A | 9/1982 |
| JP | 02237322 A | 9/1990 |

\* cited by examiner

Primary Examiner—John D. Lee
(74) Attorney, Agent, or Firm—Birdwell Janke & Durando

(57) ABSTRACT

An optical fiber emulator. The emulator receives a digitally-encoded optical signal; demodulates the optical signal to produce serial electrical pulses representative of the digital signal; converts the serial pulses to parallel pulses; propagates the parallel pulses through a shift register whose propagation time is less than or equal to the time of a length of fiber to be emulated. The emulator then converts the parallel pulses at the output of the shift register to serial pulses; modulates an optical carrier with the serial pulses from the shift register; and attenuates the modulated optical signal an amount corresponding to the length of the fiber being emulated to produce an output optical signal whose propagation time is substantially equal to that of a section of optical fiber to be emulated. The shift register may be tapped at any point to obtain an output delayed by a desired amount corresponding to a selected section of optical fiber.

11 Claims, 1 Drawing Sheet

OPTICAL FIBER EMULATOR

FIELD OF THE INVENTION

This invention relates to testing fibre optic communication systems, particularly to devices for emulating optical fibre so as to test systems for communication over a relatively long section of optical fibre.

BACKGROUND OF THE INVENTION

As communication protocols and advances in data transport technologies allow optical fibre connections to operate at increased distances, it becomes necessary to test fibre optic communication systems over increasingly longer sections of optical fibre. The use of a long section of optical fibre, for example, a fibre that is a kilometer in length, in a laboratory or production test facility is both expensive and physically inconvenient because of the size of the fibre spool required. In addition, in testing a fibre optic communications system or device, it is often desirable to perform tests over various lengths of fibre. This requires the use of multiple sections of optical fibre of different respective lengths, for example, one kilometer, 5 kilometers, and 10 kilometers, which is even more expensive and inconvenient. Therefore, it would be advantageous to be able to emulate sections of optical fibre of selectable length in a physically convenient and relatively inexpensive way.

The two primary characteristics of a section of optical fibre that must be emulated to test fire optic communications systems are signal attenuation and signal propagation delay. Devices have been developed for introducing variable attenuation in an optical fibre link. Such devices are disclosed, for example, in Stankos et al., U.S. Pat. No. 4,261,640 and Tamulevich U.S. Pat. No. 4,989,938. However, neither of these devices addresses the issue of signal delay.

The simulation of signal delay, as well as attenuation, in an optical fibre has been addressed by the disclosure of Deloddere et al. U.S. Pat. No. 5,777,765. In the device of Deloddere et al. an optical signal is demodulated to produce an electrical signal whose amplitude is representative of the intensity envelope of the optical signal. That electrical signal is then sampled periodically and the samples are digitized. The digitized samples are then applied to the input of a shift register, which propagates the samples at substantially the same as the original optical signal would propagate on an optical fibre, However, since the electrical fluctuations between samples can be ignored, provided that the sample frequency is twice the highest significant frequency component of the electrical signal, the information in the optical signal that would propagate a given distance in a given amount of time over an optical fibre can be compressed into a shorter distance for the same amount of time in the shift register. The shift register is tapped at a point chosen for the amount of signal delay it introduces, the output modulates an optical carrier, and an attenuator is applied to the modulated carrier to simulate an amount of attenuation corresponding to the position of the shift register tap.

However, the approach to simulation of delay in Deloddere et al. is not suitable for all emulation of an optical fibre to test optical fibre communication systems. Assuming that information is presented by a fibre optic channel as asynchronous digital, or binary, data, the sample rate to reproduce the data faithfully would need to be at least twice the information transfer rate in bits per unit time. Typically, in the absence of some synchronizing mechanism, a serial digital signal would be sampled at sixteen times the data rate. This allows the data pattern to be determined, but additional logic functions would be needed to interpret the data and to reclock the data before it is retransmitted to prevent excess jitter. Alternatively, the signal may be sampled at a frequency that is higher than the jitter tolerance of the system and the shift register would have to run at that same frequency. This is impractical with current technology.

Accordingly, there has been a need for a an improved method and device for emulating an optical fibre so as to render unnecessary the use of bulky and expensive spools of test fibre in laboratory and production testing of fibre optic communication systems.

SUMMARY OF THE INVENTION

The aforementioned need has been met for digital optical communications systems by the present invention by taking advantage of the digitally-encoded nature of information transmitted over fibre optic communications systems. The invention provides a device that receives a digitally-encoded optical signal; demodulates the optical signal to produce serial electrical pulses representative of the digital signal; converts the serial pulses to parallel pulses; and propagates the parallel pulses through a shift register whose propagation time is less than or equal to the propagation time of a section of fibre to be emulated. The device then converts the parallel pulses at the output of the shift register to serial pulses; modulates an optical carrier with the serial pulses from the shift register; and attenuates the modulated optical signal an amount corresponding to that of the fibre being emulated to produce an output optical signal whose propagation time is substantially equal to that of the section of fibre to be emulated. The shift register may be tapped at any point to obtain an output delayed by a desired amount corresponding to a selected section of optical fibre. By propagating digital information code, rather than digitized signal amplitude samples, the required signal delay corresponding to a given length of optical fibre can be achieved with a shift register of practical length and cost.

Accordingly, it is a principal object of the present invention to provide a novel and improved device and method for emulating optical fibre.

It is another object of the present invention to provide a device and method for emulating a long section of optical fiber in a physically practical way.

It is a further object of the present invention to provide a device and method for emulating a long section of optical fiber by taking advantage of the digitally-encoded nature of information transmitted over fibre optic communications systems.

The foregoing and other objects, features, and advantages of the invention will be more readily understood upon consideration of the following detailed description of the invention, taken in conjunction with the accompanying drawings.

DETAILED DESCRIPTION OF THE INVENTION

Figure 1:
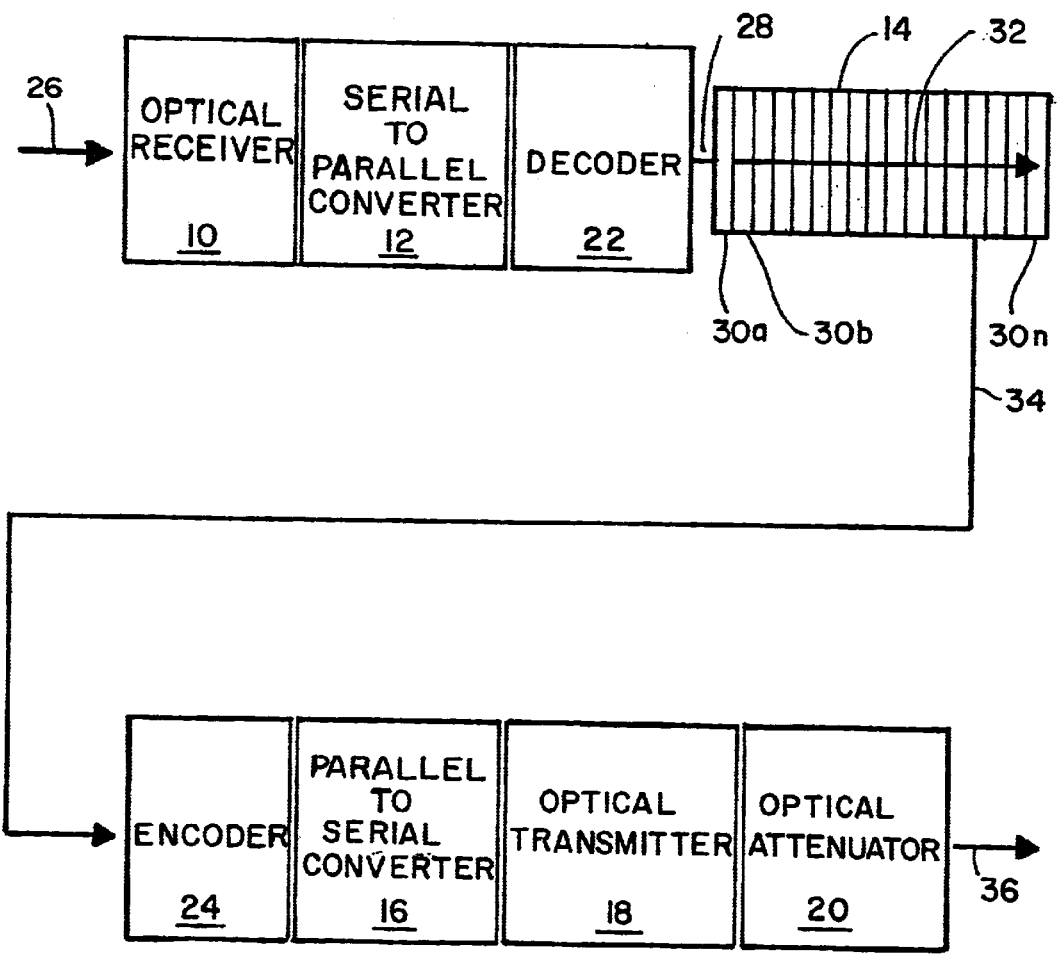
FIG. 1 is a block diagram of a preferred embodiment of an optical fibre emulator according to the present invention.

Referring to FIG. 1, a general embodiment the present invention comprises an optical receiver 10, a serial-to-parallel bit converter 12, a shift register 14, a parallel-toserial bit converter, an optical transmitter 18, and an optical attenuator 20. In a preferred embodiment, the invention also includes a decoder 22 interposed between the serial-to-parallel bit converter and the shift register, and an encoder 24 interposed between the shift register and the optical transmitter, as will be explained hereafter.

The optical receiver receives at input port 26 an optical signal that has been intensity modulated by a digital signal so as to produce optical pulses. The receiver demodulates the optical signal to produce serial electrical pulses. The serial-to-parallel converter receives serial electrical pulses from the optical receiver and converts them to serially-sequential sets of parallel pulses, or words, as is commonly understood in the art. Parallel-bit words taken or derived from the serial-to-parallel converter are applied to the input port 28 of the shift register, where they are caused to propagate sequentially through the shift register at a predetermined rate. Thus, the parallel-bit words shift from one register 30a to the next register 30b and so on in the direction shown by arrow 32.

The shift register 14 comprises a series of parallel-bit registers driven by a clock so as to receive a parallel-bit word at the input port 28 and shift the word periodically from one register in the series to the next. This type of register is commonly known as a first-in-first out shift register ("FIFO"). The clock frequency governs the rate at which digital words propagate through the FIFO. The clock rate is selected so that the information transfer rate of the FIFO is substantially equal to the information transfer rate of the optical fibre to be tested, at a given optical carrier signal wavelength. The information transfer rate is the rate at which digital data travels through the medium.

The FIFO is provided with an output port 34 that may produce its output from the content of any selected register 30a through 30n, depending on the amount of delay that is to be introduced to the propagating parallel-bit word. The output port position is selected so as to produce the same time delay, from the input port 26 to the emulator to its output port 36, for the digital word as would be experienced by the same information traveling through a section of optical fibre to be emulated.

Parallel-bit words taken or derived from the output port 34 of the FIFO are applied to the parallel-to-serial converter 16, which produces serial electrical pulses that are applied to the optical transmitter 18. The optical transmitter intensity modulates an optical carrier signal so as to reproduce the intensity-modulated digital optical data signal applied to the input port 36 of the emulator. Thus, the delay characteristic of the section of optical fibre to be emulated is produced.

To produce the same signal attenuation as the section of optical fibre to be emulated, the signal at output port 36 of the optical transmitter 20 is applied to an optical attenuator 22, the intensity of whose output at port 36 is caused, by selection or adjustment of the attenuator, to be the same as the fibre section to be emulated, as will be appreciated by a person of ordinary skill in the art.

As previously stated, the invention preferably also includes a decoder 22 interposed between the serial-to-parallel bit converter and the shift register, and an encoder 24 interposed between the shift register and the optical transmitter. Although the digital data to be transmitted over an optical fibre commonly originates in the form of 8-bit words to be transmitted serially, there are advantages to encoding those words to create longer transmission words based on a particular transmission code. The advantages to such encoding may include better recovery of clocking, facilitating AC coupling, adapting the frequency spectrum of the signal to the transmission channel, and improved error detection. To implement a transmission code, the original 8-bit data is encoded before it modulates an optical carrier signal, and is decoded to 8 bits when it is received.

One such encoding scheme is disclosed in Franaszek et al. U.S. Pat. No. 4,486,739, entitled BYTE ORIENTED DC BALANCED (0,4) 8B/10B PARTITIONED BLOCK TRANSMISSION CODE, hereby incorporated by reference in its entirety. The encoding apparatus and method disclosed in Franaszek et al. encodes 8-bit data words into 10-bit transmission words and vice-versa, and is a preferred encoding system for use with the present invention, as described hereafter. However, it is to be recognized that data and encoding schemes other than 8-bit data and other than 10-bit transmission words, and apparatuses and methods other than what is disclosed in Franaszek et al., may be used with the present invention without departing from the principles of the invention.

In the fibre emulator of the present invention, the optical signal applied to the input port 26 is preferred and assumed to be modulated by a 10-bit transmission code. After being converted from serial to parallel form by serial-to-parallel converter 12, the data are applied to decoder 22, which converts the parallel 10-bit transmission code to a parallel 8-bit data code, preferably using the apparatus and method disclosed in Franaszek et al. The output data from the FIFO are, accordingly, converted from 8-bit words to 10-bit words using the Franaszek et al. scheme, and then serialized by the parallel-to-serial converter 18. While the fibre emulator of the invention could be implemented without decoding the transmission coded data, the 8-bit code significantly reduces the size of the shift register that must be used.

Thus, it can be seen that, by taking advantage of the digitally-encoded nature of the data transmitted over a fibre optic communications system, a practical long fibre emulator can be made. This approach avoids the use of sample-hold and analog-to-digital conversion required by a sampling system, and reduces the length of shift register required to emulate a given section of optical fibre to less than that required by a sampling system. In addition, the inclusion of a parallel-bit decoding and encoding scheme such as that described in Franaszek et al. further reduces the size of the shift register required for a given amount of delay.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An optical fibre emulator, comprising:

an optical signal demodulator, having an input port for receiving a digitally-encoded optical signal and an output port for producing a digitally-encoded electrical signal corresponding to said digitally-encoded optical signal;

a digital shifter register for propagating digital data encoded on said electrical signal, said shift register having an input port for receiving said digital data encoded on said electrical signal, an information transfer rate substantially equal to the information transmission rate of a section of optical fibre of given length for a given wavelength, and an output port for reproducing said digital data after a predetermined time delay; and an optical signal modulator, having an input port for receiving said digital data from said output port of said shift register and an output port for producing a digitally-encoded optical signal corresponding to said digitally-encoded electrical signal, the information transfer time from said input port of said optical signal demodulator to said output port of said optical signal modulator being less than or equal to the information transfer time of said section of optical fibre.

2. The optical fibre emulator of claim 1, further comprising an optical signal attenuator, having an input port for receiving said digitally-encoded optical signal from said optical signal modulator and an output port for producing an attenuated version of said digitally-encoded optical signal.

3. The optical fibre emulator of claim 2, wherein the amount of attenuation introduced by said optical signal attenuator is substantially equal to the amount of attenuation experienced by an optical signal propagating through said section of optical fibre, and the information transfer time from said input port of said optical signal demodulator to said output port of said optical signal attenuator is substantially equal to the information transfer time of said section of optical fibre.

4. The optical fibre emulator of claim 1, wherein said shift register comprises a series of digital registers wherein data is shifted periodically from one to the next, and said output port may be selectively connected to any of said shift registers to vary the amount of time delay introduced by said shift register.

5. The optical fibre emulator of claim 1, further comprising a serial-to-parallel bit converter disposed between said optical signal demodulator and said input port of said digital shift register so as to convert serial-bit digital data words received from said demodulator to parallel-bit data words for application to said shift register, and a parallel-to-serial bit converter disposed between said output port of said digital shift register and said optical modulator so as to convert parallel-bit data words derived from said shift register to serial-bit words for modulation of said optical carrier signal.

6. The optical fibre emulator of claim 5, further comprising a digital decoder disposed between said serial-to-parallel bit converter and said input port of said digital shift register so as to convert a transmission code of a first length to a data code of a second, shorter length prior to application of said digital data to said shift register, and a digital encoder disposed between said output port of said shift register and said parallel-to-serial bit converter so as to convert said data code of said second length to said transmission code of said first length prior to application of said digital data to said parallel-to-serial bit converter.

7. The optical fibre emulator of claim 6, wherein the length of said transmission code is 10 bits and the length of said data code is 8 bits.

8. The optical fibre emulator of claim 6, further comprising an optical signal attenuator, having an input port for receiving said digitally-encoded optical signal from said optical signal modulator and an output port for producing an attenuated version of said digitally-encoded optical signal.

9. The optical fibre emulator of claim 8, wherein the amount of attenuation introduced by said optical signal attenuator is substantially equal to the amount of attenuation experienced by an optical signal propagating through said section of optical fibre, and the information transfer time from said input port of said optical signal demodulator to said output port of said optical signal attenuator is substantially equal to the information transfer time of said section of optical fibre.

10. The optical fibre emulator of claim 5, further comprising a digital decoder disposed between said serial-to-parallel bit converter and said input port of said digital shift register so as to convert a transmission code of a first length to a data code of a second, shorter length prior to application of said digital data to said shift register, and a digital encoder disposed between said output port of said shift register and said optical signal modulator so as to convert said data code of said second length to said transmission code of said first length prior to application of said digital data to said optical signal modulator.

11. The optical fibre emulator of claim 10, wherein the length of said transmission code is 10 bits per word and the length of said data code is 8 bits per word.

* * * * *